J. C. YAGER.
RESILIENT TIRE.
APPLICATION FILED NOV. 26, 1919.

1,432,094. Patented Oct. 17, 1922.

Inventor
John C. Yager.

Patented Oct. 17, 1922.

1,432,094

UNITED STATES PATENT OFFICE.

JOHN C. YAGER, OF ALEXANDRIA, MINNESOTA.

RESILIENT TIRE.

Application filed November 26, 1919. Serial No. 340,897.

*To all whom it may concern:*

Be it known that I, JOHN C. YAGER, a citizen of the United States, residing at Alexandria, in the county of Douglas and State of Minnesota, have invented certain new and useful Improvements in a Resilient Tire, of which the following is a specification.

My invention relates to improvements in resilient tires for vehicles and aims primarily to provide a tire of this character having a maximum amount of resiliency, simple in construction, easy to assemble, and inexpensive to manufacture.

A further object of the invention is to provide a device of the above mentioned character including means whereby each segment of the tire may be independently adjusted with relation to the rim of the wheel to which it is attached.

A further object lies in the provision of a rim in combination with a tire of the above mentioned structure, having elongated openings throughout its circumference to permit the insertion of a wrench to facilitate in adjusting the segments.

Other objects and advantages of the invention will be apparent during the course of the following description.

Figure 1:
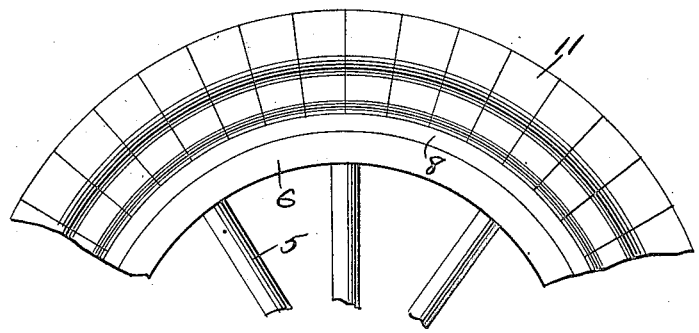
Figure 2:
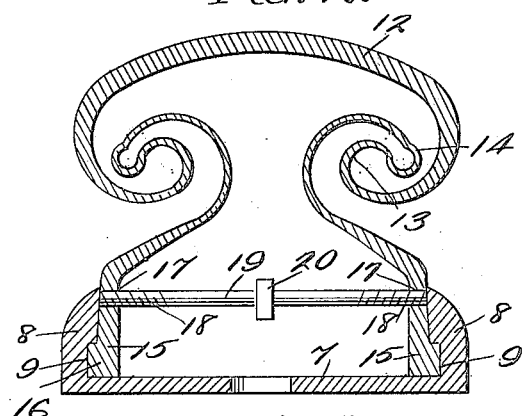
Figure 3:
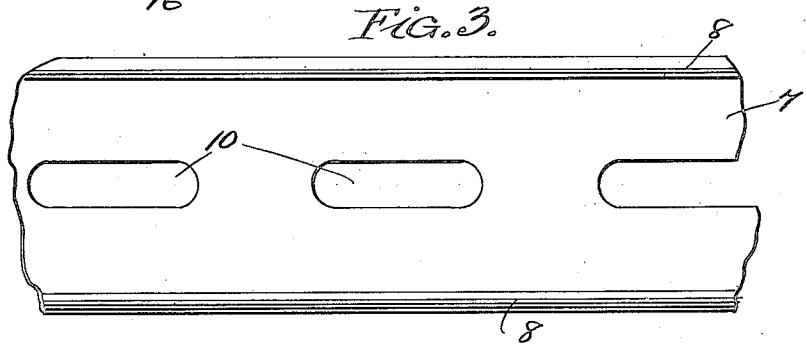

In the accompanying drawings forming a part of this specification and in which like numerals are employed to designate like parts throughout the same, Figure 1, is a fragmentary side view of a vehicle wheel having my improved tire attached thereto;

Figure 2, is a central transverse sectional view through one of the segments showing the manner in which the same is attached to the rim; and Figure 3, is a fragmentary plan section of the rim.

In the drawings, wherein for the purpose of illustration, I have shown a preferred embodiment of my invention, the numeral 5 designates the spokes of a wheel of the ordinary structure and 6 the felly which is encircled by the demountable rim 7 that projects laterally beyond the sides of the felly. The outer edges of the rim 7 are provided with a pair of annular flanges 8 the inner sides of which are recessed circumferentially, as at 9, for a purpose to be described later. Intermediate the two flanged sides of the rim 7 and arranged at spaced intervals throughout its entire circumference are a plurality of elongated openings 10, the purpose of which will appear later.

The tire proper consists of a plurality of metallic segments 11 arranged in a series around the rim 7. Each of said segments consists of a semi-elliptical tread portion 12, the edges of which are curved inwardly upon themselves, as at 13, and then reversed as at 14, being curved outwardly until in alinement with the reversed loops 14, from which point they extend radially forming the side pieces 15. The outer edges of the side pieces 15 are provided with outwardly extending curved flanges 16 adapted for engagement with the annular recesses 9 when the segments are adjusted to the rim.

Extending through the side pieces 15 are screw threaded openings 17 in alinement with each other and adapted to receive the oppositely threaded ends 18 of the transversely disposed bars 19 which effects the spreading and contracting of the side pieces 15 when attaching the segments to the rim. Intermediate the length of the bars 19 I provide nuts 20 which are integrally connected therewith to receive a wrench which may be inserted through the openings 10 in the rim when the tire is being removed from the wheel.

In use, the segments 11 are arranged upon the rim 7 before being placed upon the wheel of the vehicle. In attaching the segments, the bars 19 are adjusted so as to contract the sides 15 which permits the placing of the segments between the flanged edges of the rim 7, so that the flanges 16 will engage the recesses 9 which prevents displacement of the segments. The bars 19 are then adjusted so that the sides will be expanded and held in a rigid position. To facilitate the adjustment of the bars 19 the rim is provided with a series of elongated openings 10 through which a wrench may be inserted to cooperate with the nuts 20 integrally formed on the bars 19. This permits the last segments which are attached to the rim to be adjusted just as accurately as the other segments. It will also be noted that curvilinear portions interpose the tread portion and the radially disposed sides 15, so as to absorb the shocks to which the tire is subject. Thus it is obvious from the foregoing that a very simple and yet highly efficient resilient tire has been produced that may be easily assembled and yet produce the maximum amount of resiliency.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus fully described my invention, I claim:—

1. In a resilient tire for vehicles the combination of a flanged rim, circumferentially extending recesses formed along the inner sides of the flanges, a plurality of metallic segments having oppositely disposed side pieces, curved flanges extending outwardly from the inner edges of the side pieces adapted to engage the said recesses, adjusting rods for spreading and contracting the said sides, and openings through the rim permitting the insertion of a wrench to adjust the rods.

2. In a resilient tire for vehicles, the combination of a flanged rim having recesses formed along the inner sides of the flanges, a plurality of spring segments having oppositely disposed sides, curved flanges projecting from the sides of the segments and fitting within the recesses formed in the flanges of the rim, and rods for adjusting the segments to the rim.

3. In a resilient tire, the combination of a rim, a plurality of spring segments mounted on the rim each having a semi-elliptical tread portion, radially disposed side portions, and reversed curvilinear portions connecting the tread portions of the segments with the side portions, said reversed curvilinear portions each having one curved portion fitted within the other in spaced relation thereto.

In testimony whereof, I have affixed my signature in the presence of two witnesses.

JOHN C. YAGER.

Witnesses:
J. M. Renner,
N. H. Renner.